(12) United States Patent
Kim et al.

(10) Patent No.: US 10,619,733 B2
(45) Date of Patent: Apr. 14, 2020

(54) SHIFT LEVER ASSEMBLY FOR AUTOMATIC TRANSMISSION VEHICLE

(71) Applicants: Hyundai Motor Company, Seoul (KR); Kia Motors Corporation, Seoul (KR)

(72) Inventors: Yong Ik Kim, Gyeonggi-do (KR); Bum Jun Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/949,304

(22) Filed: Apr. 10, 2018

(65) Prior Publication Data

US 2019/0154144 A1 May 23, 2019

(30) Foreign Application Priority Data

Nov. 20, 2017 (KR) .......................... 10-2017-0154466

(51) Int. Cl.
*F16H 61/24* (2006.01)
*F16H 59/02* (2006.01)

(52) U.S. Cl.
CPC .......... *F16H 61/24* (2013.01); *F16H 59/0204* (2013.01); *F16H 2061/241* (2013.01)

(58) Field of Classification Search
CPC .............. F16H 61/24; F16H 2061/241; F16H 2061/243; F16H 59/0204; F16H 59/0278; F16H 59/10; F16H 2059/026; B60K 20/02; H01H 2003/008; G06F 2203/015; H02K 1/06; H02K 1/12
USPC ................................ 74/473.18, 473.25, 537
See application file for complete search history.

(56) References Cited

U.S. PATENT DOCUMENTS

| 5,309,787 | A | * | 5/1994 | Soyka | G05G 5/065 |
| | | | | | 29/441.1 |
| 5,722,292 | A | * | 3/1998 | Anderson | F16H 59/0204 |
| | | | | | 74/335 |
| 6,230,579 | B1 | * | 5/2001 | Reasoner | F16H 59/0204 |
| | | | | | 74/473.18 |
| 6,237,435 | B1 | * | 5/2001 | Gronhage | F16H 59/0204 |
| | | | | | 74/471 XY |
| 6,382,045 | B1 | * | 5/2002 | Wheeler | F16H 61/24 |
| | | | | | 74/473.12 |
| 6,415,677 | B1 | * | 7/2002 | Skogward | F16H 59/0217 |
| | | | | | 324/117 H |

(Continued)

FOREIGN PATENT DOCUMENTS

| KR | 20020038901 A | 5/2002 |
| KR | 20130067763 A | 6/2013 |

*Primary Examiner* — Jake Cook
*Assistant Examiner* — T. Scott Fix
(74) *Attorney, Agent, or Firm* — Mintz Levin Cohn Ferris Glovsky and Popeo, P.C.; Peter F. Corless

(57) ABSTRACT

A shift lever assembly for an automatic transmission vehicle is provided. A moderate feeling experienced by a driver is provided by using magnetic forces of a bullet magnet and a groove magnet when moving a shift lever in a shift direction and in a select direction. Since the bullet magnet and the groove magnet are spaced apart from each other by a predetermined distance to avoid coming into contact with each other within a range affected by magnetic forces thereof, damage due to wear is prevented and operating noise is reduced significantly.

10 Claims, 5 Drawing Sheets

(56) References Cited

U.S. PATENT DOCUMENTS

| | | | | |
|---|---|---|---|---|
| 6,629,473 | B2* | 10/2003 | Syamoto | B60R 25/063 |
| | | | | 70/247 |
| 2001/0017063 | A1* | 8/2001 | Wildeshaus | F16H 61/24 |
| | | | | 74/473.29 |
| 2004/0083838 | A1* | 5/2004 | Easton | F16H 59/0278 |
| | | | | 74/335 |
| 2008/0148894 | A1* | 6/2008 | Rapin | F16H 59/0204 |
| | | | | 74/473.21 |
| 2010/0090689 | A1* | 4/2010 | Furuki | G01D 5/145 |
| | | | | 324/207.24 |
| 2012/0187940 | A1* | 7/2012 | Uhlenbruck | F16H 59/0204 |
| | | | | 324/207.11 |

\* cited by examiner

SHIFT LEVER ASSEMBLY FOR AUTOMATIC TRANSMISSION VEHICLE

CROSS REFERENCE TO RELATED APPLICATION

The present application claims priority to Korean Patent Application No. 10-2017-0154466, filed Nov. 20, 2017, the entire contents of which is incorporated herein for all purposes by this reference.

BACKGROUND

Field of the Invention

The present invention relates to a shift lever assembly for an automatic transmission vehicle, and more particularly, to a shift lever assembly for an automatic transmission vehicle, in which a moderate feeling is provided by using a magnetic force when moving the shift lever in a shift direction and a select direction.

Description of the Related Art

A shift lever assembly for an automatic transmission vehicle is configured such that a driver is able to select an automatic mode or a sports mode based on by manipulating the shift lever in a shift direction and a select direction. In other words, in the automatic mode, the shift lever is moved in the shift direction (e.g., forward and backward directions) along a slot for automatic mode to select a parking (P) range, a reverse (R) range, a neutral (N) range, and a driving (D) range, and a slot for sports mode is provided at the side of the D range, wherein the slot for sports mode is connected via a connecting slot that extends in right and left directions from the D range.

The driver manipulates the shift lever positioned in the D range in the select direction (right and left directions) through the connecting slot to move the shift lever to the slot for sports mode, and manipulates the shift lever to a front up-shift (+ direction) or a rear down-shift (− direction), whereby it is possible to drive more dynamically in the sports mode. Meanwhile, the shift lever includes a detent mechanism that has a bullet and a spring, and a lever housing includes a groove with the bullet brought into contact therewith.

The groove is in a convex-concave shape with protrusions and depressions continuously connected to each other, whereby when the shift lever is manipulated in the shift direction and the select direction, the bullet is moved along the groove to implement moderate motion. However, the conventional shift lever assembly is problematic in that since the bullet is brought into direct contact with the groove, there is a risk of damage due to wear during manipulation of the shift lever, and particularly noise may be generated. Further, to give different feeling of manipulation when moving the shift lever to the shift direction and to move the shift lever to the select direction, a height of the protrusion of the groove disposed in the select direction is generally higher than that of the protrusion of the groove disposed in the shift direction, which requires a more substantial manipulation when shifting the shift lever in the select direction, increasing the fatigue of the driver due to manipulation, and may result in greater wear and noise.

The foregoing is intended merely to aid in the understanding of the background of the present invention, and is not intended to mean that the present invention falls within the purview of the related art that is already known to those skilled in the art.

SUMMARY

Accordingly, the present invention provides a shift lever assembly for an automatic transmission vehicle, in which it is possible to provide a moderate feeling by using a magnetic force when moving the shift lever in a shift direction and a select direction, and particularly, a predetermined gap between the bullet and the groove is maintained to avoid coming into direct contact with each other, whereby it is possible to eliminate a risk of damage due to wear, to significantly reduce operating noise, and particularly, to significantly reduce the fatigue of the driver due to manipulation.

In order to achieve the above object, according to one aspect of the present invention, a shift lever assembly for an automatic transmission vehicle may include: a bullet elastically mounted to a shift lever through a spring; a bullet magnet coupled to the bullet to be exposed through a surface of a fore end of the bullet; a position fixing member fixedly disposed in a lever housing to face the fore end of the bullet, and having a connecting groove that connects an automatic mode groove and a sports mode groove together and an automatic mode groove and a sports mode groove together; and a groove magnet coupled to the automatic mode groove, the sports mode groove, and the connecting groove to be exposed through surfaces thereof. The bullet magnet and the groove magnet may be spaced apart from each other by a predetermined distance to avoid coming into contact with each other within a range affected by magnetic forces thereof.

The automatic mode groove may be in a convex-concave shape with a plurality of protrusions and depressions continuously connected to each other along a shift direction of the shift lever, and when the bullet magnet is disposed in the depressions, any one shift range of P range, R range, N range, and D range may be selected. The groove magnet may include first border magnets coupled to the protrusions of the automatic mode groove and gear magnets coupled to the depressions of the automatic mode groove; the first border magnets may have same magnetic forces and be configured to generate repulsive forces with the bullet magnet. The gear magnets may be include a P range magnet, an R range magnet, an N range magnet, and a D range magnet with a same magnetic force and may be configured to generate attractive forces with the bullet magnet.

The connecting groove may be in a convex-concave shape with one protrusion and one depression connected to each other along a select direction of the shift lever. The groove magnet may include a second border magnet coupled to the protrusion of the connecting groove, and a null magnet coupled to the depression of the connecting groove. The second border magnet may be configured to generate a repulsive force with the bullet magnet and the null magnet may be configured to generate an attractive force with the bullet magnet. The second border magnet of the connecting groove may be configured to generate a magnetic force greater than magnetic forces of first border magnets of the automatic mode groove.

The sports mode groove may include one front depression at a front of the depression of the connecting groove, and one rear depression at a back thereof. When the bullet magnet is disposed at the front depression, up-shift (+) may be selected, and when the bullet magnet is disposed at the rear depression, down-shift (−) may be selected. The groove magnet may include an up-shift magnet coupled to the front depression, and a down-shift magnet coupled to the rear depression and each of the up-shift magnet and the down-shift magnet may be configured to generate a repulsive force with the bullet magnet.

The shift lever may include a mount aperture with the spring and the bullet inserted therein and the mount aperture may be fixedly provided with a stopper member at an entrance thereof to prevent the bullet from being separated from the mount aperture. The stopper member may be in a washer shape and be configured such that the fore end of the bullet is exposed to an outside through an internal aperture of the stopper member. Additionally, a stop step of the bullet may be stopped at a bottom surface of the washer-shaped stopper member, thereby preventing the bullet from being separated from the mount aperture.

According to an exemplary embodiment of the present invention, it may be possible to provide a moderate feeling by using a magnetic force when moving the shift lever in a shift direction and a select direction, and particularly, since the bullet magnet and the groove magnet are spaced apart from each other by a predetermined gap to avoid coming into direct contact with each other within a range affected by magnetic forces thereof, it may be possible to eliminate a risk of damage due to wear, it may be possible to significantly reduce operating noise, and particularly, it may be possible to significantly reduce the fatigue of the driver due to manipulation.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, a shift lever assembly for an automatic transmission vehicle according to an exemplary embodiment of the present invention will be described in detail with reference to the accompanying drawings.

Figure 1:
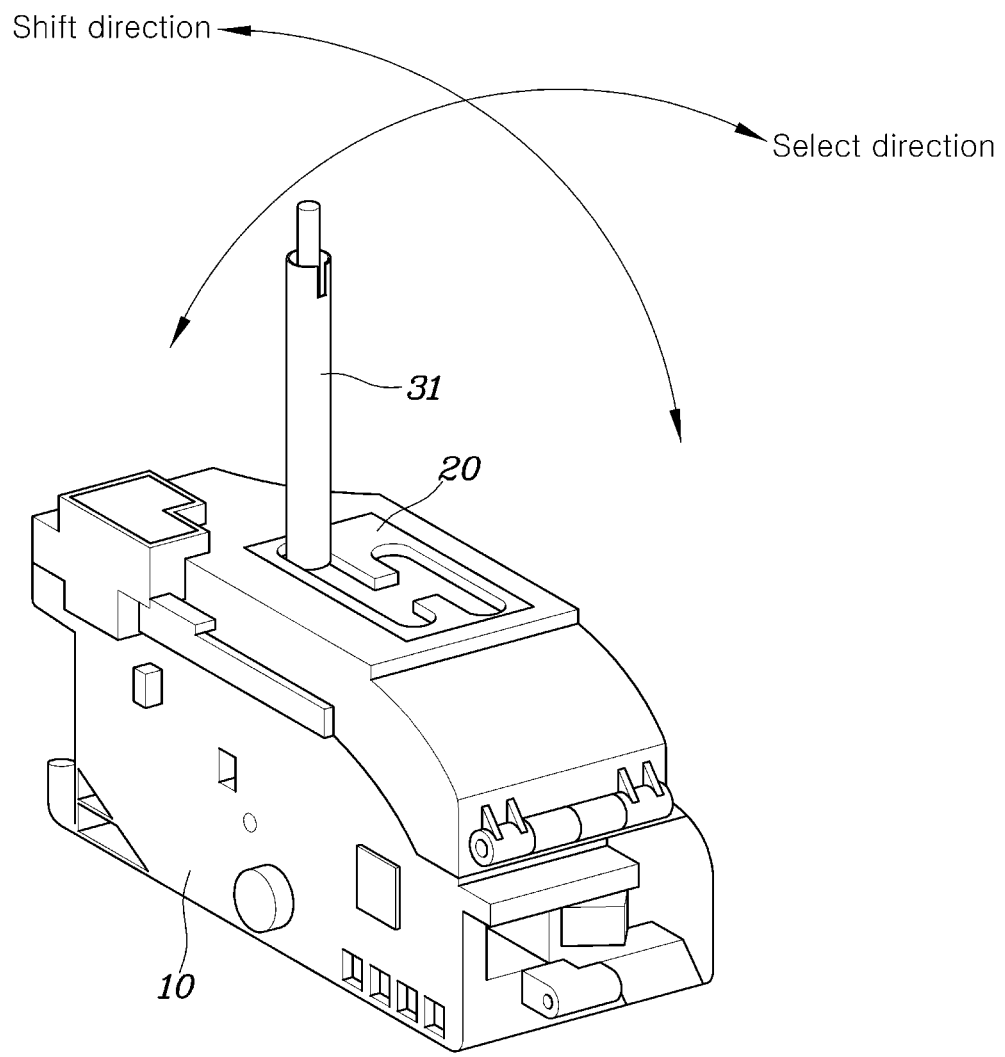
FIG. 1 is a perspective view showing a shift lever assembly for an automatic transmission vehicle according to an exemplary embodiment of the present invention.
Figure 2:
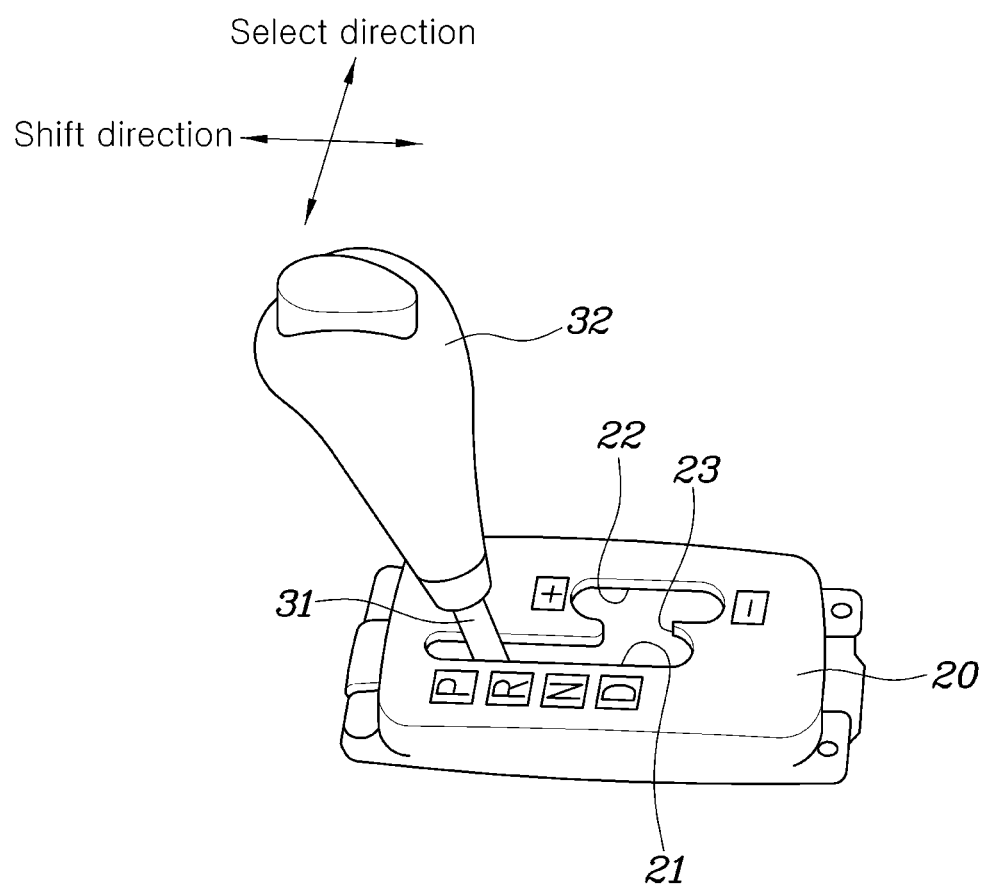
FIG. 2 is a perspective view showing a detent plate according to an exemplary embodiment of the present invention.
Figure 3:
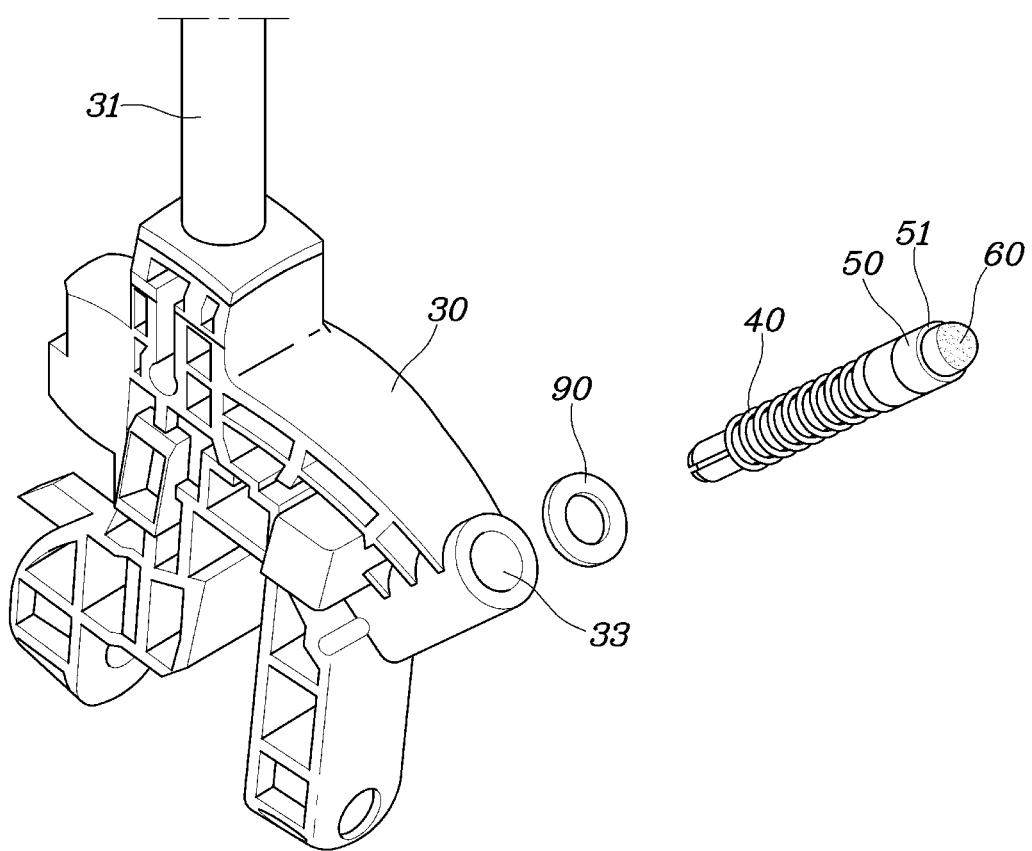
FIG. 3 is an exploded perspective view showing a shift lever and a bullet according to an exemplary embodiment of the present invention.
Figure 4:
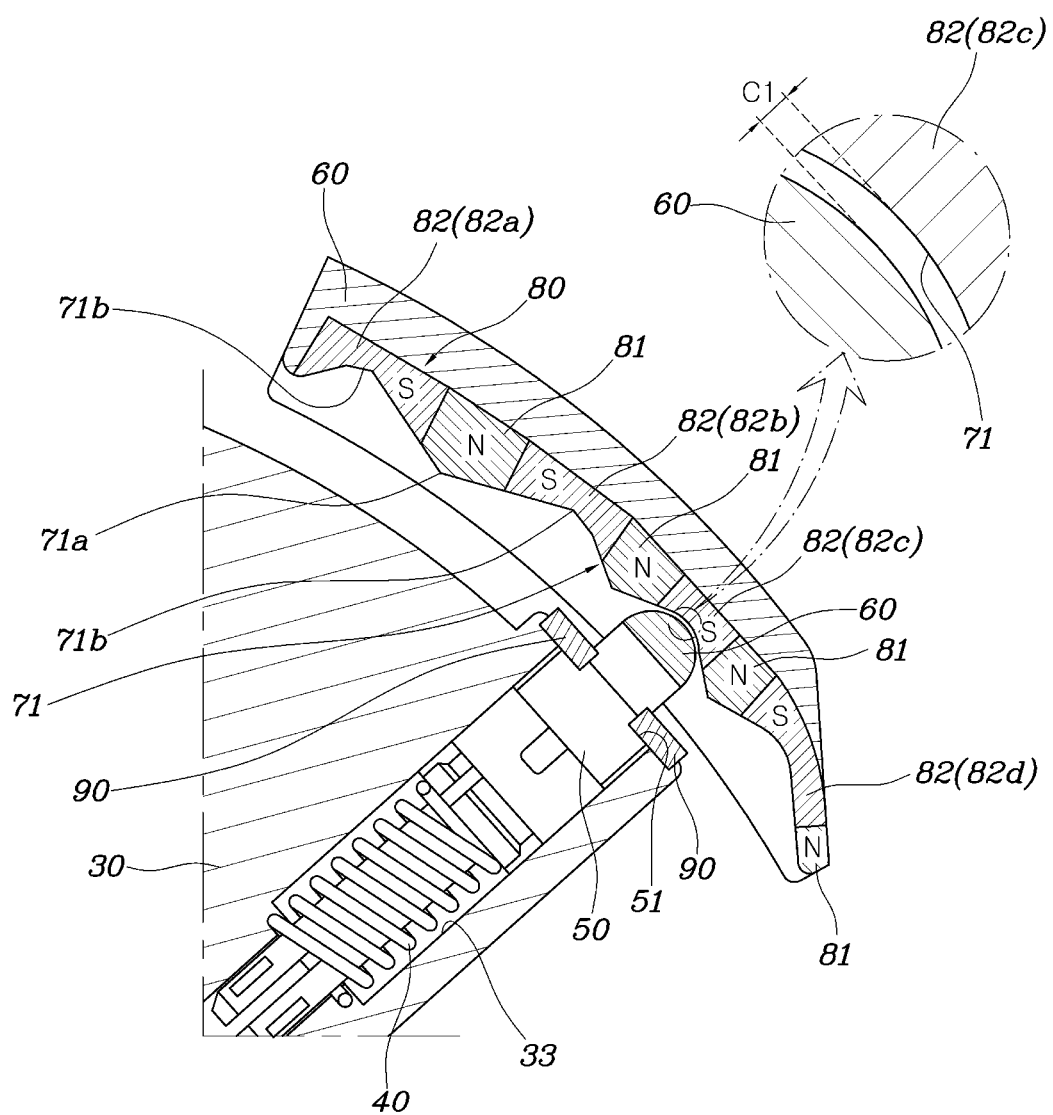
FIG. 4 is a view showing the relationship between a bullet magnet and a groove magnet according to an exemplary embodiment of the present invention.
Figure 5:
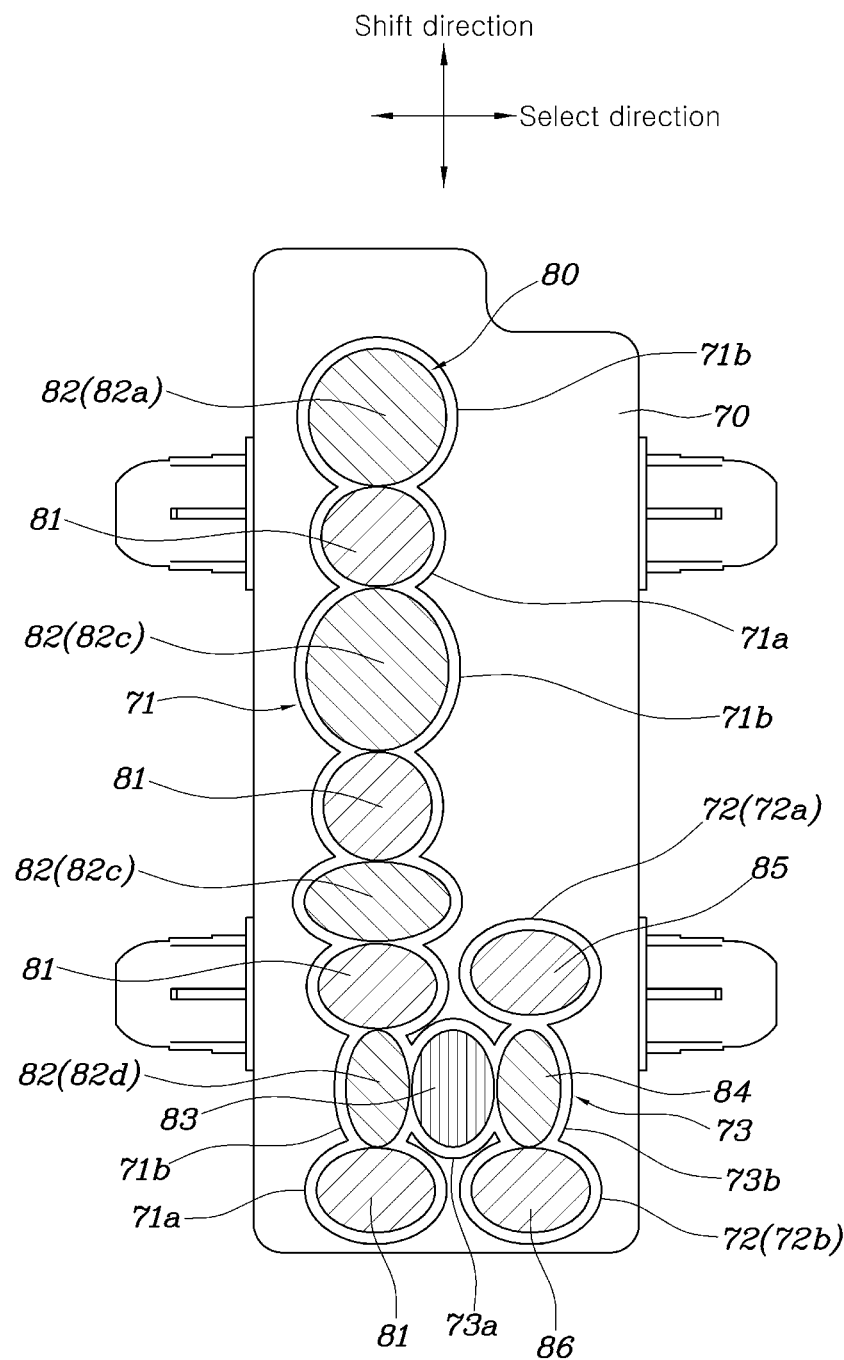
FIG. 5 is a view showing a position fixing member with the groove magnet coupled thereto according to an exemplary embodiment of the present invention.

As shown in FIGS. 1 to 5, a shift lever assembly for an automatic transmission vehicle according to the present invention is configured such that a driver may select an automatic mode or a sports mode by manipulating the shift lever in a shift direction and a select direction. In particular, a detent plate 20 formed with an automatic mode slot 21, a sports mode slot 22, and a connecting slot 23 may be coupled to a lever housing 10. The automatic mode slot 21 and the sports mode slot 22 are formed to extend in forward and backward directions (in the shift direction of the shift lever), and the connecting slot 23 is formed to extend in right and left directions (in the select direction of the shift lever). The shift lever 30 including a knob 31 and a rod 32 may be rotatably coupled to the lever housing 10.

Hereinafter, the configuration including the knob 31 and the rod 32 is defined as the shift lever 30. The shift lever 30 is coupled to the lever housing 10 to be disposed therein, the rod 32 may be disposed through a slot of the detent plate 20, and the knob 31 may be coupled to an end of the rod 32 to allow the driver to grasp the knob. In the automatic mode, the shift lever 30 may be moved in the shift direction (forward and backward directions) along the automatic mode slot 21 to select a parking (P) range, a reverse (R) range, a neutral (N) range, and a driving (D) range.

In other words, the rod 32 moves along the automatic mode slot 21, but in the above description, the configuration including the knob 31 and the rod 32 is defined as the shift lever 30, so it is described that the shift lever 30 is moved along the automatic mode slot 21. In the automatic mode slot 21, the sports mode slot 22 may be formed at a side of the D range to extend in the forward and backward directions, and the automatic mode slot 21 and the sports mode slot 22 may be connected via the connecting slot 23 that extends in the right and left directions at the D range. As the driver moves or manipulates the shift lever 30 disposed at the D range to the select direction (right and left directions) through the connecting slot 23 to move the shift lever 30 to the sports mode slot 22, the shift lever 30 is moved to a front up-shift (+ direction) or a rear down-shift (− direction), whereby it is possible to drive more dynamically in the sports mode.

Further, the shift lever assembly according to the present invention may include: a bullet 50 mounted to the shift lever 30 through a spring 40; a bullet magnet 60 coupled to the bullet 50 to be exposed through a surface of a fore end of the bullet; a position fixing member 70 fixedly disposed in a lever housing 10 to face the fore end of the bullet 50, and having a connecting groove 73 that connects an automatic mode groove 71 and a sports mode groove 72 together; and a groove magnet 80 coupled to the automatic mode groove 71, the sports mode groove 72, and the connecting groove 73 to be exposed through surfaces thereof. The bullet magnet 60 and the groove magnet 80 may be spaced apart from each other by a predetermined distance C1 to avoid coming into contact with each other within a range affected by magnetic forces thereof.

The spring 40 and the bullet 50 are a detent mechanism, and the bullet 50 is subjected to the force of movement toward the position fixing member 70 by an elastic force of the spring 40. The bullet magnet 60 may be integrally coupled during injection molding of the bullet 50 through insert injection and the groove magnet 80 may be integrally coupled during injection molding of the position fixing member 70 through insert injection. The automatic mode groove 71 formed in the position fixing member 70 may be in a convex-concave shape with a plurality of protrusions 71a and depressions 71b continuously connected to each other along the shift direction of the shift lever 30, and when the bullet magnet 60 is disposed in the depressions 71b, any one shift range of P range, R range, N range, and D range may be selected.

Additionally, the connecting groove 73 may be in a convex-concave shape with one protrusion 73a and one depression 73b connected to each other along a select direction of the shift lever 30 in the D range, and the sports mode groove 72 may include one front depression 72a at a front of the depression 73b of the connecting groove 73 and one rear depression 72b at a back thereof. When the bullet magnet 60 is disposed at the front depression 72a by the movement of the shift lever 30, up-shift (+) may be selected, and when the bullet magnet is disposed at the rear depression 72b, down-shift (−) may be selected.

The groove magnet 80 may include a plurality of first border magnets 81 coupled to the protrusions 71a of the automatic mode groove 71, and a plurality of gear magnets 82 coupled to the depressions 71b of the automatic mode groove 71. The first border magnets 81 may have same magnetic forces and may be configured to generate repulsive forces with the bullet magnet 60. In other words, the first border magnets 81 and the bullet magnet 60 may have the same polarity as the N and N poles or the S and S poles. The gear magnets 82 may include a P range magnet 82a, an R range magnet 82b, an N range magnet 82c, and a D range magnet 82d with a same magnetic force and may be configured to generate attractive forces with the bullet magnet 60. The gear magnets 82 and the bullet magnet 60 may have the same polarity as the N and N poles or the S and S poles.

Further, the groove magnet 80 may include a second border magnet 83 coupled to the protrusion 73a of the connecting groove 73, and a null magnet 84 coupled to the depression 73b of the connecting groove 73. The second border magnet 83 and the bullet magnet 60 may be configured to generate a repulsive force between the N pole and the N pole or between the S pole and the S pole, and the null magnet 84 and the bullet magnet 60 may be configured to generate an attractive force between the N and S poles or between the S and N poles.

Particularly, the second border magnet 83 coupled to the protrusion 73a of the connecting groove 73 may be configured to generate a magnetic force greater than magnetic forces of the first border magnets 81 coupled to the protrusions 71a of the automatic mode groove 71, and thus, the feeling of manipulation (e.g., moderate feeling) experienced by a driver when the shift lever 30 is moved along the automatic mode groove 71 is different from the feeling of manipulation (moderate feeling) experienced by the driver when the shift lever 30 is moved along the connecting groove 73. Accordingly, the driver may recognize the difference more easily through the feeling when manipulating the shift lever 30 in the shift direction or in the select direction.

Moreover, the groove magnet 80 may include an up-shift magnet 85 coupled to the front depression 72a of the sports mode groove 72, and a down-shift magnet 86 coupled to the rear depression 72b. The up-shift magnet 85 and the down-shift magnet 86 may all be configured to generate repulsive forces with the bullet magnet 60. In other words, the magnets may have the same polarity at the bullet magnet, as the N and N poles or the S and S poles. The shift lever 30 of the present invention may further include a mount aperture 33 with the spring 40 and the bullet 50 inserted therein, and an entrance of the mount aperture 33 may be fixedly provided with a stopper member 90 to prevent the bullet 50 from being separated from the mount aperture 33. The stopper member 90, which is in a washer shape, may have the fore end of the bullet 50 exposed to the outside through an internal aperture of the stopper member, and a stop step 51 of the bullet 50 may be stopped at a bottom surface of the washer-shaped stopper member 90, thereby preventing the bullet 50 from being separated from the mount aperture 33.

The repulsive force between the bullet magnet 60 and the groove magnet 80 may be generated by the shift lever 30 being moved in the shift direction or the select direction and the bullet 50 may be moved backward to be inserted into the mount aperture 33 by the repulsive force. In particular, the spring 40 may be compressed and the attractive force between the bullet magnet 60 and the groove magnet 80 may be generated, and the bullet 50 may be moved forward to come out from (e.g., eject out of) the mount aperture 33 by both the attractive force and the restoring force of the spring 40. When the bullet may be moved forward, the stopper member 90 may restrict or block the forward movement of the bullet 50, thereby preventing the bullet 50 from being separated from the mount aperture 33.

As described above, according to the exemplary embodiment of the present invention, it may be possible to provide a moderate feeling using the magnetic forces of the bullet magnet 60 and the groove magnet 80 when moving the shift lever 30 in the shift direction and in the select direction. Particularly, since the bullet magnet 60 and the groove magnet 80 may be spaced apart from each other by the predetermined distance C1 to avoid coming into contact with each other within a range affected by magnetic forces thereof, it may be possible to prevent the bullet magnet 60 and the groove magnet 80, or the bullet 50 and the position fixing member 70 from coming into direct contact with each other, whereby it may be possible to prevent damage due to wear, to significantly reduce operating noise, and to significantly reduce the fatigue of the driver due to manipulation.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A shift lever assembly for an automatic transmission vehicle, comprising:
    a bullet elastically mounted to a shift lever through a spring;
    a bullet magnet coupled to the bullet to be exposed through a surface of a fore end of the bullet;
    a position fixing member fixedly disposed in a lever housing to face the fore end of the bullet, and having an automatic mode groove and a sports mode groove and a connecting groove that connects the automatic mode groove and the sports mode groove together; and
    a groove magnet coupled to the automatic mode groove, the sports mode groove, and the connecting groove to be exposed through surfaces thereof,
    wherein the bullet magnet and the groove magnet are always spaced apart from each other by a predetermined distance by an influence of a magnetic field generated by interactions from each other,
    wherein the shift lever includes a mount aperture with the spring and the bullet inserted therein and the mount aperture is fixedly provided with a stopper member at an entrance thereof to prevent the bullet from being separated from the mount aperture, and
    wherein the predetermined distance between the bullet magnet and the groove magnet is defined depending on a position of the stopper member adjustable along a direction of a length of the bullet.

2. The shift lever assembly of claim 1, wherein the automatic mode groove is in a convex-concave shape with a plurality of protrusions and depressions continuously connected to each other along a shift direction of the shift lever, and when the bullet magnet is disposed in a corresponding one of the plurality of depressions, any one shift range of a parking (P) range, a reverse (R) range, a neutral (N) range, and a drive (D) range is selected.

3. The shift lever assembly of claim 2, wherein the groove magnet includes:
    first border magnets coupled to the protrusions of the automatic mode groove and gear magnets coupled to the depressions of the automatic mode groove,
    wherein the first border magnets have same magnetic forces and are configured to generate repulsive forces with the bullet magnet, and
    wherein the gear magnets include a P range magnet, an R range magnet, an N range magnet, and a D range magnet with a same magnetic force and are configured to generate attractive forces with the bullet magnet.

4. The shift lever assembly of claim 1, wherein the connecting groove is in a convex-concave shape with one protrusion and one depression connected to each other along a select direction of the shift lever.

5. The shift lever assembly of claim 4, wherein the groove magnet includes:
    a second border magnet coupled to the protrusion of the connecting groove, and a null magnet coupled to the depression of the connecting groove,
    wherein the second border magnet is configured to generate a repulsive force with the bullet magnet, and
    wherein the null magnet is configured to generate an attractive force with the bullet magnet.

6. The shift lever assembly of claim 5, wherein the second border magnet of the connecting groove is configured to generate a strength of the magnetic field greater than that of each of first border magnets of the automatic mode groove.

7. The shift lever assembly of claim 4, wherein the sports mode groove includes one front depression at a front of the depression of the connecting groove, and one rear depression at a back thereof and when the bullet magnet is disposed at the front depression, up-shift (+) is selected, and when the bullet magnet is disposed at the rear depression, down-shift (−) is selected.

8. The shift lever assembly of claim 7, wherein the groove magnet includes:
    an up-shift magnet coupled to the front depression; and
    a down-shift magnet coupled to the rear depression,
    wherein each of the up-shift magnet and the down-shift magnet is configured to generate a repulsive force with the bullet magnet.

9. The shift lever assembly of claim 1, wherein the stopper member is in a washer shape and has the fore end of the bullet exposed to an outside through an internal aperture of the stopper member; and a stop step of the bullet is stopped at a bottom surface of the washer-shaped stopper member to prevent the bullet from being separated from the mount aperture.

10. A vehicle having the shift lever assembly for an automatic transmission of claim 1.

* * * * *